United States Patent
Cohen et al.

(10) Patent No.: US 9,639,132 B2
(45) Date of Patent: May 2, 2017

(54) SYSTEMS AND METHODS FOR AUTOMATIC DETECTION OF A DEVICE

(71) Applicant: SCHNEIDER ELECTRIC IT CORPORATION, West Kingston, RI (US)

(72) Inventors: Daniel C. Cohen, Newton, MA (US); Michael John Patterson, Townsend, MA (US); Gary R. Ware, Newton, MA (US); James S. Spitaels, Shrewsbury, MA (US); Noah L. Pendleton, Woburn, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 121 days.

(21) Appl. No.: 14/573,480

(22) Filed: Dec. 17, 2014

(65) Prior Publication Data

US 2016/0179153 A1    Jun. 23, 2016

(51) Int. Cl.
| | | |
|---|---|---|
| G06F 11/34 | (2006.01) |
| G06F 1/26 | (2006.01) |
| G06F 13/38 | (2006.01) |
| G06F 1/30 | (2006.01) |
| G06F 1/32 | (2006.01) |
| G06F 11/22 | (2006.01) |
| G06F 11/30 | (2006.01) |

(52) U.S. Cl.
CPC ............... *G06F 1/263* (2013.01); *G06F 1/26* (2013.01); *G06F 1/30* (2013.01); *G06F 1/32* (2013.01); *G06F 11/2247* (2013.01); *G06F 11/3051* (2013.01); *G06F 13/385* (2013.01)

(58) Field of Classification Search
CPC .. G06F 1/263; G06F 11/2247; G06F 11/3051; G06F 13/385
See application file for complete search history.

(56) References Cited

U.S. PATENT DOCUMENTS

| | | | |
|---|---|---|---|
| 6,445,088 B1* | 9/2002 | Spitaels | H02J 9/061 |
| | | | 307/66 |
| 7,447,922 B1 | 11/2008 | Asbury et al. | |
| 2006/0282691 A1* | 12/2006 | Barthe | G06F 1/266 |
| | | | 713/300 |

(Continued)

FOREIGN PATENT DOCUMENTS

| | | |
|---|---|---|
| EP | 2421119 A2 | 2/2012 |
| GB | 2473123 A | 3/2011 |
| WO | 2014105079 A1 | 7/2014 |

OTHER PUBLICATIONS

Extended European Search Report from corresponding European Application No. 1519912.5 dated Mar. 2, 2016.

*Primary Examiner* — Henry Tsai
*Assistant Examiner* — John Roche
(74) *Attorney, Agent, or Firm* — Lando & Anastasi, LLP

(57) ABSTRACT

Methods and systems for detection of a status of a device connected to a USB port of a UPS are described herein. The method includes detecting whether a device is connected to the USB port, based on the detection, receiving, at the UPS, information from the device; determining whether the device is configured as a host device supplying power, a host device requiring power or a peripheral device, and based on the determination, configuring the USB port of the UPS.

29 Claims, 5 Drawing Sheets

(56) References Cited

U.S. PATENT DOCUMENTS

2011/0055407 A1* 3/2011 Lydon .................. G06F 13/385
709/228
2012/0210023 A1* 8/2012 Ozaki ..................... G06F 1/266
710/16

* cited by examiner

SYSTEMS AND METHODS FOR AUTOMATIC DETECTION OF A DEVICE

BACKGROUND

Technical Field

Embodiments of the present disclosure relate generally to the automatic detection of a device. More specifically, embodiments relate to systems and methods for automatic detection of whether a device connected to an uninterruptible power supply (UPS) system is a standard universal serial bus (USB) host, a standard USB device, or a host that requires power.

Background Discussion

Conventional USB communication techniques and methods require a base device (e.g., the UPS) to have a USB host stack and additional drivers for any and all potential devices that may plug into the UPS. These additional drivers and the USB host stack consume firmware resources and may require additional memory along with modifications for each potential device plugged into the UPS.

SUMMARY

One aspect is directed to an Uninterruptible Power Supply (UPS) that includes a first input configured to receive input power from a first power source, a second input configured to receive input power from a second power source, an output configured to provide output power derived from at least one of the first power source and the second power source, a universal serial bus (USB) port, a detection module coupled to the USB port, and a controller coupled to the detection module and the USB port and configured to determine whether a device connected to the USB port is configured as a host device supplying power, a host device requiring power or a peripheral device.

The UPS may be further configured to communicate with the device connected to the UPS through the USB port. The controller may be further configured to control communications with the device connected to the USB port based on whether the device connected to the UPS is configured as a host device supplying power, a host device requiring power or a peripheral device. The UPS may be configured, based on a determination that the device connected to the USB port is configured as a host device requiring power, to provide power to the device connected to the USB port through the USB port. The USB port may be a USB A port. The UPS may further include a power supply coupled to the detection module to provide power to the USB port. The detection module may further include circuitry to protect the UPS from power supplied to the UPS at the USB port. The detection module may further include a sensor configured to detect a voltage provided at the USB port from a device coupled to the USB port. The device may be a wireless-enabled adapter, and the controller may be configured to communicate with the wireless-enabled adapter through the USB port.

Another aspect is directed to a UPS that includes a first input configured to receive input power from a first power source, a second input configured to receive input power from a second power source, an output configured to provide output power derived from at least one of the first power source and the second power source, a universal serial bus (USB) port, and means, coupled to the USB port, for determining whether a device connected to the USB port is configured as a host device supplying power, a host device requiring power or a peripheral device.

The UPS may further include means for configuring the USB port based on whether a device connected to the USB port is configured as a host device supplying power, a host device requiring power or a peripheral device. The USB port may be a USB A port. The UPS may further include means for supplying power to the USB port based on a determination that a device coupled to the USB port is a host device requiring power.

Another aspect is directed to a method for detection of a status of a device connected to a USB port of a UPS. The method includes detecting whether a device is connected to the USB port, based on the detection, receiving, at the UPS, information from the device, determining whether the device is configured as a host device supplying power, a host device requiring power or a peripheral device, and based on the determination, configuring the USB port of the UPS.

The method may further include controlling communications with the device connected to the USB port based on whether the device connected to the USB port is configured as a host device supplying power, a host device requiring power or a peripheral device. The method may further include, based on a determination that the device connected to the USB port is configured as a host device requiring power, providing power to the device connected to the USB port through the USB port. The USB port may be a USB A port. The method may further include protecting the UPS from power supplied to the UPS at the USB port. The method may further include detecting a voltage provided at the USB port from a device coupled to the USB port. The device may be a wireless-enabled adapter, and the method may further include configuring the UPS to communicate with the wireless adapter through the USB port.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "another embodiment," "some embodiments," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
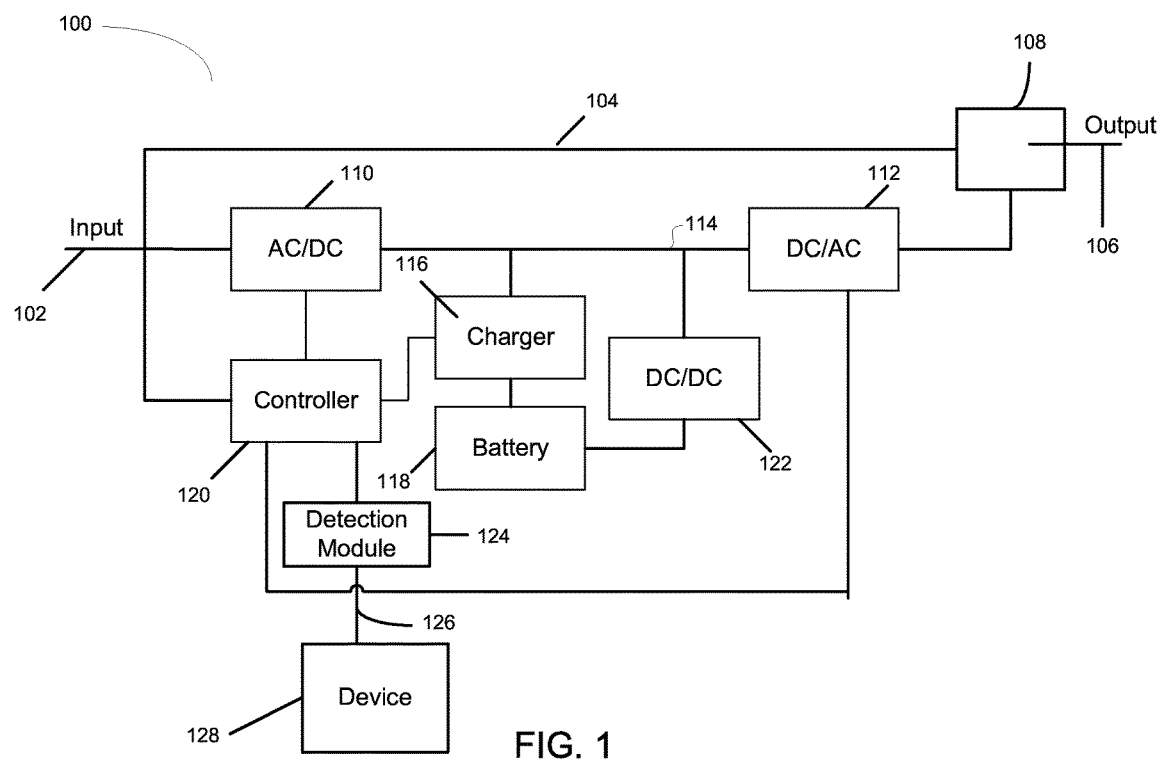
FIG. 1 illustrates an online uninterruptible power supply including a detection module, according to one implementation.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

A variety of USB devices may be connected to a device such as a UPS through a USB port. These USB devices typically provide additional functionality, such as Wi-Fi or other wireless connectivity and/or additional data storage. In typical systems, to support connection to a myriad of USB devices, the UPS is required to contain software to support communications with all of the devices. This may increase the storage requirements of the UPS and may require frequent updates to the firmware of the UPS. These issues may be addressed by use of external USB hosts (rather than USB devices), in which case the UPS functions as a peripheral. The common method of selecting between a Host and a device is to use a USB On-The-Go port. This port is not commonly used and connectors and cables are not as readily available. Additionally this method requires additional signal wire to determine whether the connected device is a host or a device. This method also does not support the desired new configuration of a device powered host. Other embodiments disclosed herein provide detection methods that are compatible with more commonly used USB ports.

In at least some embodiments described herein, a UPS has the capability to provide automatic detection of whether a connected device to the UPS is a standard USB host, a standard USB device or a host that requires power from the UPS. In at least some embodiments, the UPS has a standard USB-A connector for coupling to USB hosts, devices and device powered hosts.

FIG. 1 illustrates an online UPS 100, including a detection module 124 according to aspects of the current disclosure. The UPS 100 includes an input 102, an output 106, a bypass line 104, an AC/DC converter 110, a DC bus 114, a DC/AC inverter 112, a battery charger 116, a battery 118, a DC/DC converter 122, and a controller 120. The input 102 is configured to be coupled to an AC power source such as a utility power source and to the AC/DC converter 110. The input 102 is also selectively coupled to the output 106 via the bypass line 104 and the switch 108.

The AC/DC converter 110 is also coupled to the DC/AC inverter 112 via the DC bus 114. The DC/AC inverter 112 is also selectively coupled to the output 106 via the switch 108. The battery 118 is coupled to the DC bus 114 via the battery charger 116 and also to the DC bus 111 via the DC/DC converter 122. The controller 120 is coupled to the input 102, the switch 108, the battery charger 116, the AC/DC converter 110, and the DC/AC inverter 112. In other embodiments, the battery 118 and the charger 116 may be coupled to the AC/DC converter 110.

Based on the quality of the AC power received from the utility source, the UPS 100 is configured to operate in different modes of operation. For example, according to one embodiment, the controller 120 monitors the AC power received from the utility source at the input 102 and, based on the monitored AC power, sends control signals to the switch 108, the battery charger 116, the AC/DC converter 110, and the DC/AC inverter 112 to control operation of the UPS 100.

The UPS 100 may be configured to operate in several modes of operation. For example, the UPS 100 may have modes of operation including bypass, online, or battery. In both battery and online modes, the DC/AC inverter 112 may be used by the UPS 100 to measure output current at the output 106 to determine an output load current. The controller 120 may use the output load current during operation of the DC/AC inverter 112. For example, an output current may be determined for the output 106 based on a voltage measurement as described below. In at least one embodiment, the output load current may be used by the controller 120 to regulate the output of the inverter 112.

In some implementations, the controller 120 communicates with the detection module 124. The detection module 124 includes a connection 126 to a device 128 that is connected to the UPS 100.

The connection 126 may include a USB port, e.g., USB A port, having a standard cable connection interface to allow the device 128 to be connected to the UPS or to allow another device, such as a computing device connect to the UPS.

As shown in FIG. 1, the UPS 100 includes the detection module 124. The detection module 124 may be configured to determine whether the device 128 is connected to the UPS 100. The detection module 124 is configured to determine how the device 128 is configured. For example, the detection module 124 can determine whether the device 128 connected to the UPS 100 is configured as a host device supplying power, a host device requiring power, or a peripheral device, and the UPS is configured to automatically operate appropriately based on the type of device detected.

Based on the determination that the device 128 is configured as a host device requiring power (a device-powered USB host), the UPS 100 is configured to supply power to the device 128. In this implementation, functionality can be added to the UPS via external hosts without the need for the UPS 100 to contain files and drivers for the device 128.

Other configurations of FIG. 1 may be implemented. For example, the device 128 or the UPS 100 may be connected to each other using a USB hub. The USB hub plugs into the USB port and includes additional ports for other devices to connect. The device 128 or the UPS 100 may be configured as the USB hub.

Figure 2:
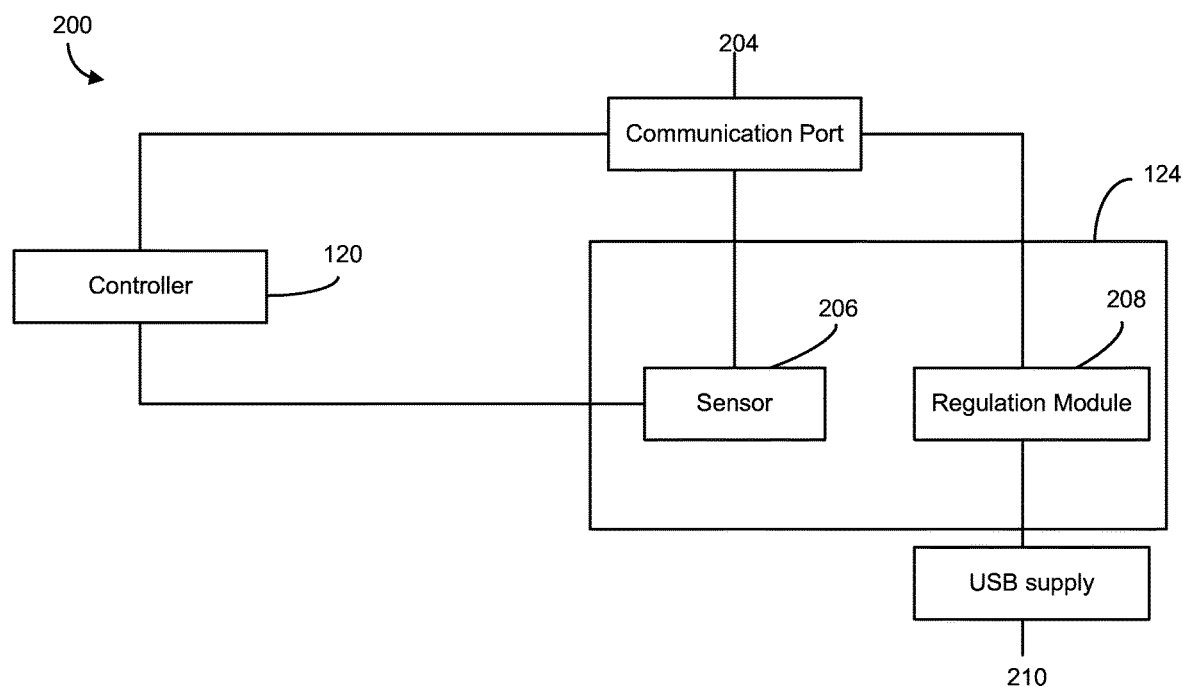
FIG. 2 illustrates a schematic of the detection module in greater detail, according to one implementation.

FIG. 2 illustrates a schematic diagram 200 of the detection module 124 in communication with the controller 120 via a communication port 204 and in communication with a USB supply 210 contained in the UPS 100, in accordance with one embodiment. The detection module 124 includes a sensor 206 and a regulation module 208.

In one implementation, the controller 120 is coupled to the communication port 204 to provide communication with the external USB device 128. In one implementation, the communication port 204 is a USB A port. In other implementations, the communication port 204 may be a Bluetooth, Ethernet, or wireless Ethernet port. The communication port 204 may be coupled to one or more external input/output devices, such as a keyboard, monitor, mobile device, networking device, such as a switch or router, and so forth. The communication port 204 is also coupled to the detection module 124 via the sensor 206 and the regulation module 208.

The sensor 206 is also coupled to the controller 120. The controller 120 receives signals from the sensor 206 and based on the signals determines how the device 128 is configured.

In one implementation, in which the communication port 204 is a USB A connector, the sensor 206 and the regulation module 208 are coupled to pin 1 of the USB A connector. If the external device 128 is a USB host providing power, then the sensor circuit will detect a voltage of 5V at pin 1 and provide a signal to the controller 120. Based on the signal from the sensor 206, the controller 120 determines that the device 128 is a USB host device, and communicates with the device accordingly.

If no voltage is detected at pin 1, then the external device 128 is operating as either a traditional USB device or as a USB host requiring power. In this case, the controller 120 attempts to communicate with the external device 128. If communication is successful, then the external device is a traditional USB device, and the controller 120 will function as a host and communicate with the device.

If no voltage is detected, and communication with the external device is unsuccessful, then the controller 120 determines that the external device is a USB host requiring power. The controller 120 will then provide power to pin 1 using the USB power supply 210 and the regulation module 208.

In one embodiment, the sensor 206 is implemented using a resistor divider circuit in combination with a pair of zener diodes to provide the signal to the controller 120 when 5V is present at pin 1.

In one embodiment, power from the USB supply is controlled using a switch in the regulation module to provide 5V to pin 1 of the USB A connector. The regulation module may also include additional regulation circuitry to ensure that the proper voltage is provided at pin 1 when desired and the regulation module may include one or more diodes to prevent damage to the regulation module and the USB power supply when voltage is provided at pin 1 from an external device.

Figure 3:
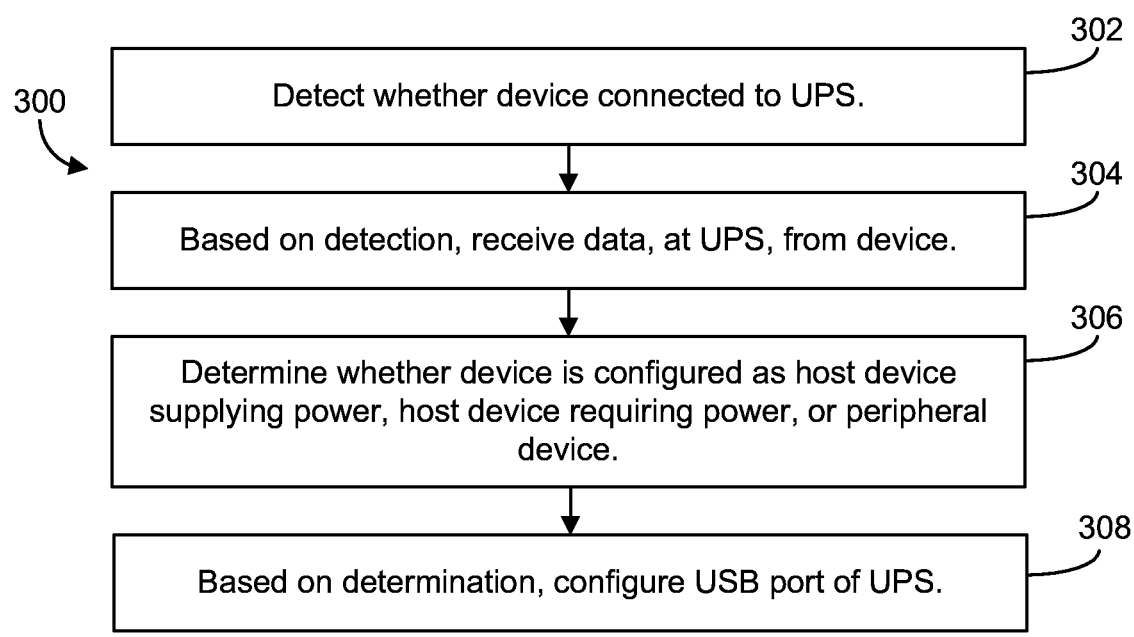
FIG. 3 illustrates a block diagram of a method for detection of a status of a device connected to a USB port of a UPS, according to one implementation.

FIG. 3 illustrates a block diagram of a method for detection of a status of a device connected to a USB port of a UPS, according to one implementation. In a general overview, the method 300 includes detecting whether a device is connected to the UPS (302), based on the detection, receiving, at the UPS, data from the device (304), determining whether the device is configured as a host device supplying power, a host device requiring power or a peripheral device (306), and based on the determination, configuring the USB port of the UPS (308).

At block 302, the method 300 includes detecting whether a device is connected to the UPS. The detection of the device involves a request from the device to the UPS to establish a connection between the device and the UPS. The device may be connected to the UPS at the USB A port. In one embodiment, the UPS 100 will detect the presence of a USB device in accordance with the USB 2.0 specified procedure by monitoring for a 1.5 kOhm pull up resistor across the data line. The UPS will detect the presence of a USB host using the normal USB procedure by monitoring for 5 volts at pin 1 of the USB connector. The UPS will detect the presence of an unpowered host device by sending a low-voltage pulse sequence on pin 2 of the USB connector and if an unpowered host device is connected, the UPS will detect the low-voltage pulse sequence at pin 3 of the USB connector.

At block 304, based on the detection, the method 300 includes receiving, at the UPS, data from the device. For example, the UPS may provide standard USB requests to the device and the device responds to the USB requests by sending requested information and receiving other actions.

At block 306, a determination is made whether the device is configured as a host device supplying power, a host device requiring power or a peripheral device. The determination may be made by the detection module 124 of the UPS 100, as described in FIG. 2. The detection module may learn about the device by requesting configuration information specified by the device. The detection module may assign and load a device driver to manage communications with the device.

At block 308, based on the determination at block 306, the USB port of the UPS is configured. After learning about the device, the USB port is automatically configured. The USB port receives a request from the detection module via the device driver and upon receiving the request, the USB port of the UPS implements the requested configuration.

Figure 4A:
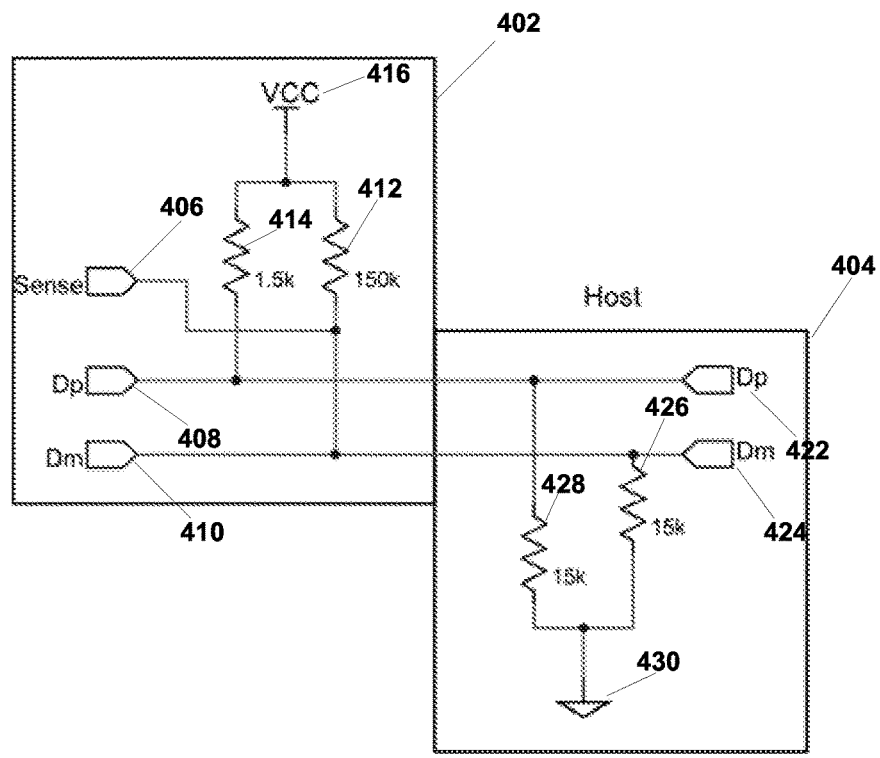
FIG. 4A illustrates a circuit diagram for detecting a host connected to a low-speed device, according to one implementation.
Figure 4B:
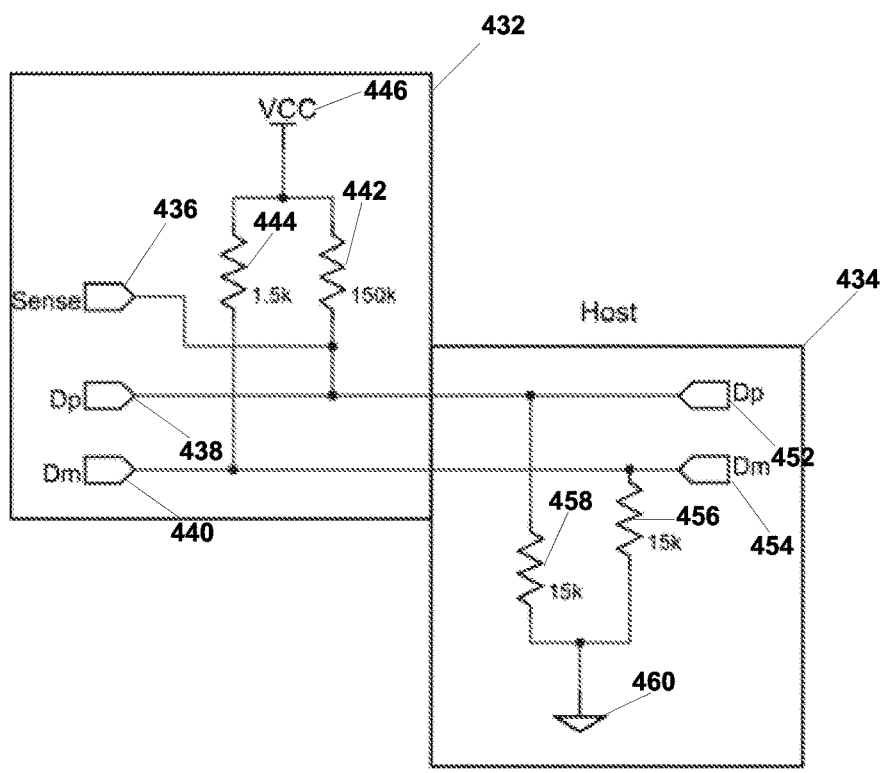
FIG. 4B illustrates a circuit diagram for detecting a host connected to a full-speed device, according to one implementation.

FIGS. 4A and 4B illustrate two embodiments of circuits that may be used in USB devices (such as the UPS 100) of the current invention to detect a bus-powered host coupled to the USB device via a standard USB connector (e.g., a USB-A female connector, a USB-B female connector, or a USB micro B female connector). In these aspects, the USB device does not require complex circuitry and may be compatible with all existing USB host, device, and USB On-The-Go devices.

FIG. 4A illustrates a circuit 402 of a USB device coupled to a USB host 404. For illustration purposes only the coupling circuitry of the USB host is shown in FIG. 4A. In some embodiments, the circuit 402 is coupled to the host 404.

The circuit 402 includes a power supply 416, a sense line 406, a first data line 408, a second data line 410, and resistors 412 and 414. The USB host 404 includes first and second data lines 422 and 424, resistors 428 and 430 and a ground reference 430.

The first data line 408 of the circuit 402 is coupled to the first data line of the host 404. The second data line of the circuit 402 is coupled to the second data line of the host. Resistor 414 of the circuit 402 is coupled between the power supply 416 and the first data line 408, and resistor 412 is coupled between the power supply 416 and the second data line 410. The sense line 406 is coupled to the second data line 410.

In the host device 404, resistor 426 is coupled between the second data line and the ground reference, and resistor 428 is coupled between the first data line 422 and the ground reference.

The circuit 402 operates to detect the host 404 as follows. A controller within the USB device, such as controller 120, monitors the sense line 406. If there is no host coupled to the USB device, the voltage at the sense line will be substantially equal to the voltage VCC of the power supply 416. If a host is coupled to the USB device, the resistor 412 in the circuit 402 and the resistor 426 in the host device 404 form a resistor divider, resulting in a voltage of VCC*(15 kΩ)/(150 kΩ+15Ω), or about 0.091*VCC in the embodiment shown in FIG. 4A.

FIG. 4B illustrates a circuit 432 of a USB device coupled to a USB host 434. For illustration purposes only the coupling circuitry of the USB host is shown in FIG. 4B.

The circuit 432 includes a power supply 446, a sense line 436, a first data line 438, a second data line 440, and resistors 442 and 444. The USB host 434 includes first and second data lines 452 and 454, resistors 428 and 430 and a ground reference 430.

The first data line 438 of the circuit 432 is coupled to the first data line of the host 434. The second data line of the circuit 432 is coupled to the second data line of the host. Resistor 444 of the circuit 432 is coupled between the power supply 446 and the first data line 438, and resistor 442 is coupled between the power supply 446 and the second data line 440. The sense line 436 is coupled to the second data line 440.

In the host device 434, resistor 456 is coupled between the second data line and the ground reference, and resistor 458 is coupled between the first data line 452 and the ground reference.

The circuit 432 operates to detect the host 434 as follows. A controller within the USB device, such as controller 120, monitors the sense line 436. If there is no host coupled to the USB device, the voltage at the sense line will be substantially equal to the voltage VCC of the power supply 446. If a host is coupled to the USB device, the resistor 442 in the circuit 432 and the resistor 458 in the host device 434 form a resistor divider, resulting in a voltage of VCC*(15 kΩ)/(150 kΩ+15Ω), or about 0.091*VCC in the embodiment shown in FIG. 4B.

FIG. 4A illustrates one embodiment of the invention that monitors a full-speed USB device 402 by connecting the pull-up resistor 412 and the pull-down resistor 414 to Dm 410. In some embodiments, the voltage of the sense pin 406 is measured and monitored to detect a host. In other embodiments, the voltage of Dm 410 is measured and monitored to detect whether or not a host is connected. In further embodiments, the voltage of the data line that connects Dm 410 and the sense pin 406 is measured and monitored to detect a host. In some embodiments, the full-speed USB device 402 may be terminated with the 150 kΩ pull-up resistor 412 connected to Dm 410 and the 15 kΩ pull-down resistor 426 connected to Dm 410 and ground 430. In these embodiments the pull-down resistors may allow the circuit to be compatible with various compliant devices, as described in the USB 2.0 specification.

FIG. 4B illustrates another embodiment of the invention that monitors a low-speed USB device 432, wherein the sense pin 436 is coupled to Dp 438 and Dp 452. The pull-up resistor 442 is coupled to the sense pin 436. The pull-down resistor 458 is also coupled to sense pin 436. Together, the pull-up resistor 442 and the pull-down resistor 458 together form a voltage divider. Dm 440 of the device 432 is coupled to Dm 454 of the host 434. Dm 440 is coupled to VCC 432 via resistor 444. Dm 454 is coupled to ground 460 via resistor 456. In some examples, when the sense pin voltage level is high (e.g., close to VCC), no host is detected. When the voltage level of the sense pin is low (e.g., less than 0.1 the value of VCC), a host is detected. Specifying a high value pull-up resistance on the sense pin 406 prevents interoperation errors with normal USB operation and allows the user of digital detection on the sense pin rather than requiring an analog-to-digital conversion for measuring the condition. In some embodiments, the low-speed USB device 432 may be terminated with the 150 kΩ pun-up resistor 442 connected to Dp 438 and the 15 kΩ pull-down resistor 458 connected to Dp 438 and ground 460. In these embodiments the pull-down resistors 458 and 460 may allow the circuit to be compatible with various compliant devices, as described in the USB 2.0 specification.

Figure 5:
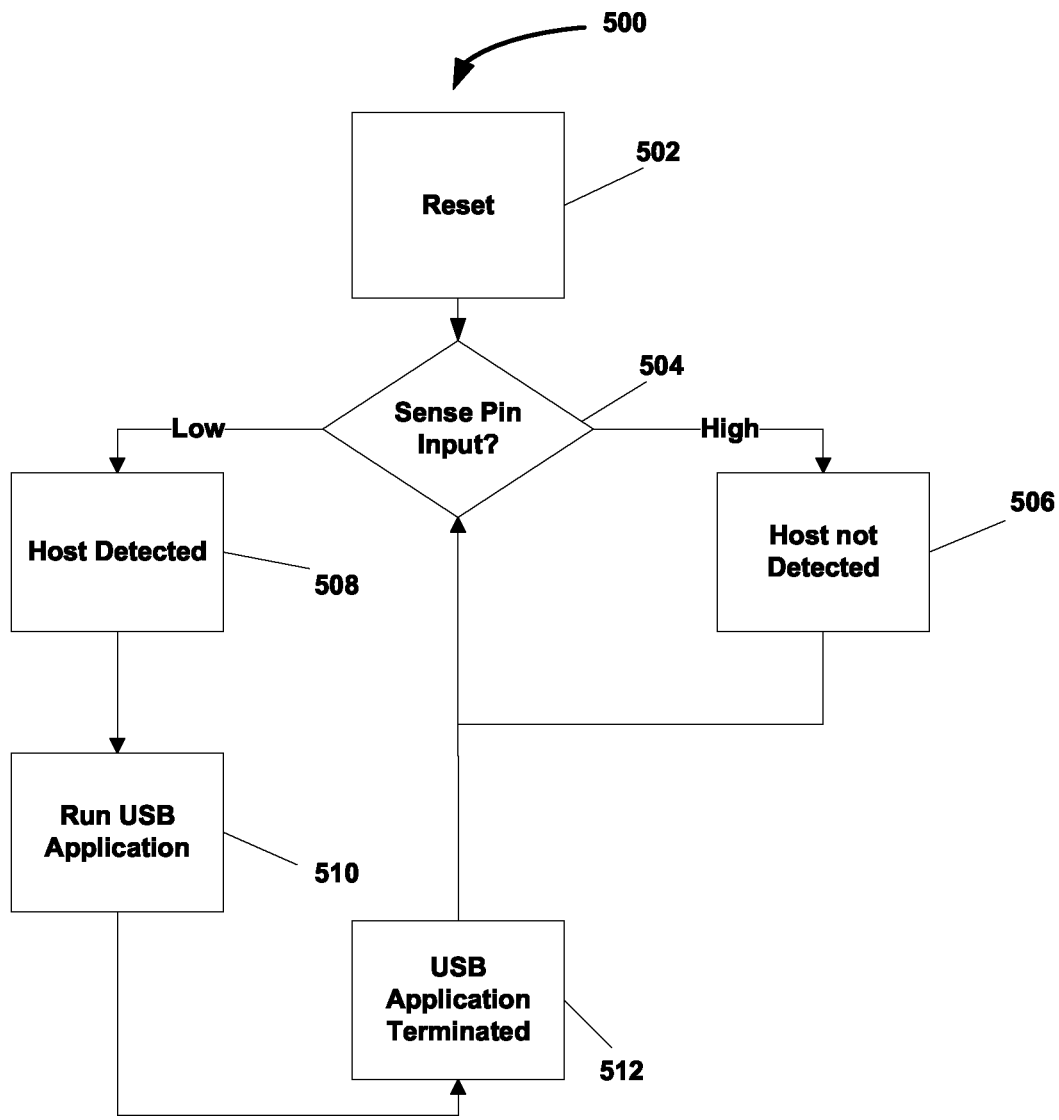
FIG. 5 illustrates a block diagram of a method for detection of a host, according to one implementation.

FIG. 5 illustrates a block diagram of a method 500 for detecting and running a USB application in a USB device according to one embodiment of the invention. The method 500 may be implemented in part using the circuits 402 and 432 discussed above. In some embodiments, the method monitors the voltage in a data line to detect a host. In other embodiments, the method monitors a sense pin to detect the host. The method 500 includes resetting a controller (502) of the USB device and monitoring the sense pin (504) using the controller. If the sense pin voltage is high, the method does not detect a host (506) and the controller continues to monitor the sense pin. The sense pin voltage level may be high because, while the device is not connected to a host, the sense pin may have a very high resistance (e.g., several megaohms) A voltage divider may be created between the sense pin and the pull-up resistor of 150 kΩ. The high resistance of the sense pin would cause the majority the majority of the voltage from VCC to be dissipated in the sense pin, causing a high voltage level. If the sense pin voltage is low, the method detects a host (508). A low pull-down resistor in the host is connected with a higher pull-up resistor in the device to create a resistor divider that causes the voltage level of the sense pin to become very low.

The controller is then configured to run a USB application associated with the host (510). After running the USB application, the USB application is terminated (512) and the method continues to monitor the sense pin voltage. In some embodiments, the USB application is terminated after the host disconnects from the device.

In other embodiments, the USB data lines may be used for detection of a device, rather than using a dedicated sense pin. In another embodiment, the controller within the USB device may implement configurable internal pull-up resistors. These resistors may be used to reduce the requirement for an external component. In yet another embodiment, circuitry may be added using, for example, digitally controlled switches to disconnect the sense pin and circuit from the USB lines after detection.

In at least some embodiment described above, an online UPS having a USB port is described. In other embodiments, method and components for communicating using USB ports described herein may be used in other types of UPS's and in other types of devices having USB ports.

Various aspects and functions described herein in accord with the present disclosure may be implemented as hardware, software, firmware or any combination thereof. Aspects in accord with the present disclosure may be implemented within methods, acts, systems, system elements and components using a variety of hardware, software or firmware configurations. Furthermore, aspects in accord with the present disclosure may be implemented as specially-programmed hardware and/or software.

Having thus described several aspects of at least one example, it is to be appreciated that various alterations, modifications, and improvements will readily occur to those skilled in the art. Such alterations, modifications, and improvements are intended to be part of this disclosure, and are intended to be within the scope of the examples discussed herein. Accordingly, the foregoing description and drawings are by way of example only.

What is claimed is:

1. An Uninterruptible Power Supply (UPS) comprising:
    a first input configured to receive input power from a first power source;
    a second input configured to receive input power from a second power source;
    an output configured to provide output power derived from at least one of the first power source and the second power source;
    a universal serial bus (USB) port having a data line with a voltage level;
    a detection module coupled to the USB port; and
    a controller coupled to the detection module and the USB port and configured to monitor the voltage level of the data line of the USB port, and to determine whether a device connected to the USB port is configured as a host device supplying power, a host device requiring power or a peripheral device, based at least in part upon the voltage level.

2. The UPS of claim 1, wherein the controller is further configured to communicate with the device connected to the UPS through the USB port.

3. The UPS of claim 2, wherein the controller is further configured to control communications with the device connected to the USB port based on whether the device connected to the UPS is configured as a host device supplying power, a host device requiring power or a peripheral device.

4. The UPS of claim 1, wherein the UPS is configured, based on a determination that the device connected to the USB port is configured as a host device requiring power, to provide power to the device connected to the USB port through the USB port.

5. The UPS of claim 4, wherein the USB port is a USB A port.

6. The UPS of claim 4, wherein the UPS further includes a power supply coupled to the detection module to provide power to the USB port.

7. The UPS of claim 4, wherein the detection module further includes circuitry to protect the UPS from power supplied to the UPS at the USB port.

8. The UPS of claim 1, wherein the detection module further includes a sensor configured to detect a voltage provided at the USB port from a device coupled to the USB port.

9. The UPS of claim 1, wherein the device is a wireless-enabled adapter, and wherein the controller is configured to communicate with the wireless-enabled adapter through the USB port.

10. The UPS of claim 1, wherein the controller is further configured to monitor the voltage level of a USB data line to provide connection status.

11. The UPS of claim 1, wherein the USB port is a USB B port.

12. The UPS of claim 1, wherein the USB port is a USB Micro-B port.

13. An Uninterruptible Power Supply (UPS) comprising:
    a first input configured to receive input power from a first power source;
    a second input configured to receive input power from a second power source;
    an output configured to provide output power derived from at least one of the first power source and the second power source;
    a universal serial bus (USB) port having a data line with a voltage level; and
    means, coupled to the USB port, for monitoring the voltage level of the data line of the USB port and for determining whether a device connected to the USB port is configured as a host device supplying power, a host device requiring power or a peripheral device, based at least in part upon the voltage level.

14. The UPS of claim 13, further comprising means for configuring the USB port based on whether a device connected to the USB port is configured as a host device supplying power, a host device requiring power, or a peripheral device.

15. The UPS of claim 14, wherein the USB port is a USB A port.

16. The UPS of claim 13, further comprising means for supplying power to the USB port based on a determination that a device coupled to the USB port is a host device requiring power.

17. The UPS of claim 13, further comprising means for monitoring the voltage level of a USB data line to provide connection status.

18. The UPS of claim 13, wherein the USB port is a USB B port.

19. The UPS of claim 13, wherein the USB port is a USB Micro-B port.

20. A method for detection of a status of a device connected to a USB port of a UPS, the method comprising:
    detecting whether a device is connected to the USB port;
    based on the detection, receiving, at the UPS, information from the device;
    determining whether the device is configured as a host device supplying power, a host device requiring power or a peripheral device, wherein the determination is based, at least in part, upon a voltage level on a data line of the USB port; and based on the determination, configuring the USB port of the UPS.

21. The method of claim 20, further comprising controlling communications with the device connected to the USB port based on whether the device connected to the USB port is configured as a host device supplying power, a host device requiring power or a peripheral device.

22. The method of claim 20, further comprising, based on a determination that the device connected to the USB port is configured as a host device requiring power, providing power to the device connected to the USB port through the USB port.

23. The method of claim 20, wherein the USB port is a USB A port.

24. The method of claim 20, further comprising protecting the UPS from power supplied to the UPS at the USB port.

25. The method of claim 20, further comprising detecting a voltage provided at the USB port from a device coupled to the USB port.

26. The method of claim 20, wherein the device is a wireless-enabled adapter, and wherein the method further comprises configuring the UPS to communicate with the wireless-enabled adapter through the USB port.

27. The method of claim 20, further comprising monitoring the voltage level of a USB data line to provide connection status.

28. The method of claim 20, wherein the USB port is a USB B port.

29. The method of claim 20, wherein the USB port is a USB Micro-B port.

* * * * *